United States Patent
Hostetler

[11] Patent Number: 6,158,827
[45] Date of Patent: Dec. 12, 2000

[54] TENSIONING ASSEMBLY FOR A TRACK-LAYING VEHICLE

[76] Inventor: Landon B. Hostetler, 109 Dawn Estate Dr., Middlebury, Ind. 46540

[21] Appl. No.: 09/312,231

[22] Filed: May 14, 1999

[51] Int. Cl.[7] .................................................. B62D 55/00
[52] U.S. Cl. .......................................... 305/154; 305/125
[58] Field of Search .................................... 305/125, 127, 305/134, 143, 144, 153, 154; 180/9.1, 9.21

[56] References Cited

U.S. PATENT DOCUMENTS

| | | | |
|---|---|---|---|
| 1,228,687 | 6/1917 | Miller | 305/154 |
| 1,591,730 | 7/1926 | Wick | 305/127 |
| 1,906,415 | 5/1933 | Rauch | 305/154 |
| 3,170,531 | 2/1965 | Katzenberger | 305/153 |
| 3,343,889 | 9/1967 | Bexten | 305/153 |
| 3,358,634 | 12/1967 | Pratt | 305/143 |
| 4,458,954 | 7/1984 | Haas . | |
| 4,522,451 | 6/1985 | Tamura et al. . | |
| 4,706,769 | 11/1987 | Latourelle et al. . | |
| 4,923,257 | 5/1990 | Purcell . | |
| 5,127,714 | 7/1992 | Satzler . | |
| 5,191,951 | 3/1993 | Bargfrede et al. | 305/153 |
| 5,246,246 | 9/1993 | Kendall . | |
| 5,279,378 | 1/1994 | Grawey et al. . | |
| 5,388,656 | 2/1995 | Lagasse | 180/9.21 |
| 5,409,305 | 4/1995 | Nagorcka . | |

*Primary Examiner*—S. Joseph Morano
*Assistant Examiner*—Long Buc Nguyen
*Attorney, Agent, or Firm*—Woodard, Emhardt, Naughton Moriarty & McNett

[57] ABSTRACT

A tensioning assembly for a track-laying vehicle having a track trained around the leading edge of a front wheel and the lagging edge of a rear wheel where at least one of the wheels is mechanically or hydraulically driven by the vehicle's motor. The tensioning assembly includes: (1) a rigid beam assembly made of a beam element telescopically and adjustably slid inside a rigid hollow member; (2) a front and rear set of bearings attached to each end of the rigid beam assembly; (3) front and rear shafts respectively journaled in the front and rear bearing sets; and (4) a plate to respectively attach the front and rear shafts to the external face of the hubs of the front and rear wheels.

9 Claims, 5 Drawing Sheets

TENSIONING ASSEMBLY FOR A TRACK-LAYING VEHICLE

This invention relates to track-laying vehicles, and more particularly relates to a tensioning assembly that helps prevent the tracks from rolling off the tires of track-laying vehicles.

BACKGROUND OF THE INVENTION

FIG. 1 illustrates a typical track-laying vehicle 1 having a chassis and frame 3 with a longitudinal axis A—A, an operator's cabin 4, and an engine 2. Although the vehicle is shown with loader arm 5, the principles that are presented in this specification will equally apply to a tracked vehicle, which is used for other operations routinely associated with track-laying vehicles such as pushing large loads.

As used in this specification, the term "external" refers to an object that is of, relates to, or connected with the external limits of the track-laying vehicle.

Track-laying vehicle 1 is propelled by at least one endless track 8 that runs along each longitudinal side of chassis 3. (For clarity, the track mounted on the opposite side of the vehicle is not shown.) Track 8 is trained around and supported by the treads on the leading side of front wheel 9 and the treads on the lagging side of rear wheel 10. Wheels 9 and 10 are typically pneumatic tires and at least one is a driven wheel, and as used here "driven" means that, absent track 8, the wheel is still mechanically or hydraulically connected to motor 2. When functioning properly, track 8 maintains lateral registry with wheels 9 and 10 due to the presence of lugs 11 that extend inwardly against the sidewalls of wheels 9 and 10 from both the inside and the outside edges of track 8. Track 8 is preferably constructed of metal such as steel or an elastomeric material such as rubber.

The track-laying vehicle described to this point is widely known and commercially available from such sources as Case Corporation located at 700 State Street, Racine, Wis. 53404, United States of America. Vehicles such as these can be ordered with the tracks installed or the tracks may be purchased separately and added to the vehicle later.

Regardless of when the tracks are installed, typically the supporting structure for wheels 9 and 10 is not fully designed to operate with track 8 in place. Track 8 tends to pull wheels 9 and 10 together, disrupting the wheels' coplanar alignment, which can eventually deform the structure that supports the wheels and cause wheels 9 and 10 to operate at something less than 180 degrees apart. In other words, the shafts upon which wheels 9 and 10 are mounted permanently deflect toward each other and force wheels 9 and 10 to rotate in separate planes.

This misalignment can cause track 8 to prematurely fail. The sidewalls of wheels 9 and 10 excessively rub against the inside of lugs 11 as track 8 travels around the wheels. This rubbing causes lugs 11 to flex inward and outward, which over time, weakens track 8 to a point where lugs 11 flip-up and track 8 rolls off wheels 9 and 10.

What is needed is a device that maintains wheels 9 and 10 in proper alignment when track 8 is used. This invention is one solution to that need.

SUMMARY OF THE INVENTION

In one aspect, this invention is a tensioning assembly for a track-laying vehicle having its track trained around the leading edge of a front wheel and the lagging edge of a rear wheel where at least one of the wheels is mechanically or hydraulically driven by the vehicle's motor. The tensioning assembly includes (1) a rigid beam assembly made of a beam element telescopically and adjustably slid inside a rigid hollow member; (2) a front and rear set of bearings attached to each end of the rigid beam assembly; (3) front and rear shafts respectively journaled in the front and rear bearing sets; and (4) a means to respectively attach the front and rear shafts to the external face of the hubs of the front and rear wheels.

An object of this invention is to prevent the track from permanently deflecting the shafts of the front and rear wheels toward each other.

Another object of this invention is to prevent the tracks from falling off of the wheels of a track-laying vehicle.

An advantage of this invention is that it is externally mounted on the track-laying vehicle and may be installed without removing the front and rear wheels to which it is attached because two lugs may be left on each wheel during the assembly process.

Another advantage of this invention is that it may also be externally mounted in the same fashion on tandem front and tandem rear wheels of a track-laying vehicle.

A feature of this invention is that it can be added to an existing track-laying vehicle without removing the track or removing the wheels upon which the track is wound.

BRIEF DESCRIPTION OF THE DRAWINGS

The advantages of the various aspects of the invention will become apparent from the following description of preferred embodiments when read in conjunction with the drawings as follows.

DETAILED DESCRIPTION OF THE PREFERRED EMBODIMENT

Specific language is used in the following description and examples to publicly disclose this invention and to convey its principles to others. No limits on the breadth of the patent rights based simply on using specific language are intended. Any alterations and modifications to this description that should normally occur to one of average skill in this technology are also included.

Figure 1:
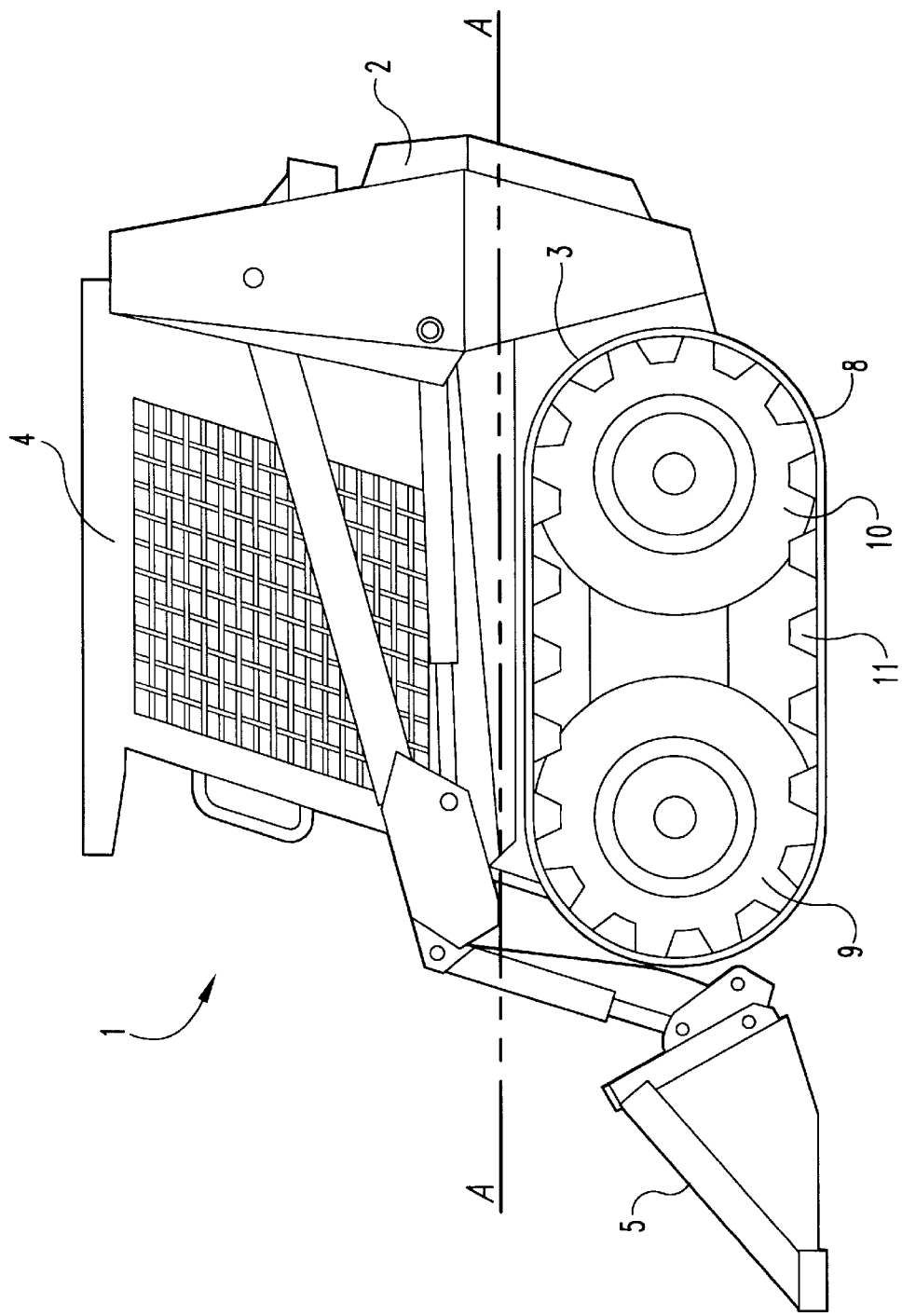
FIG. 1 is a side elevation of a typical track-laying vehicle.
Figure 2:
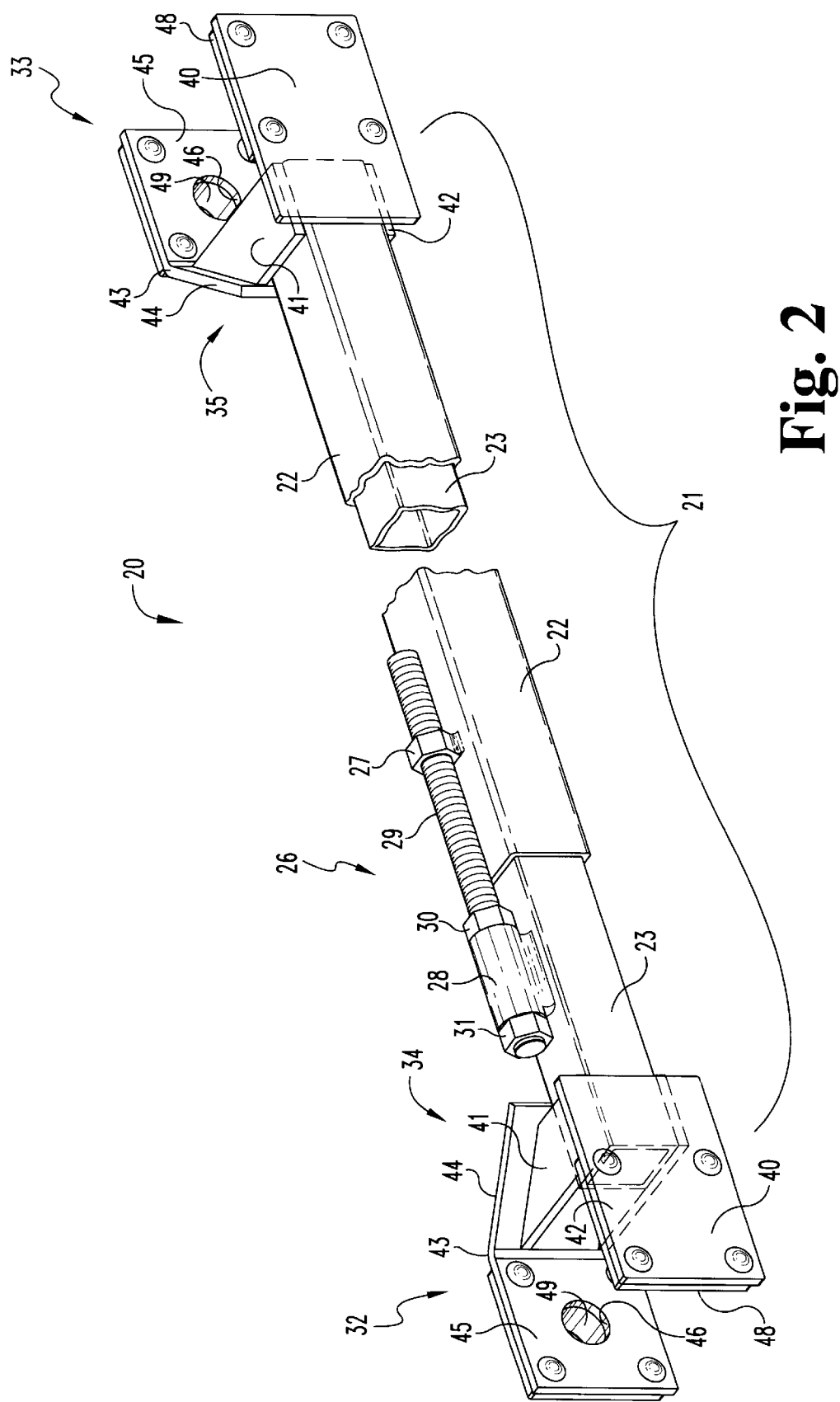
FIG. 2 is a perspective view of a portion of a tensioning assembly according to one embodiment of this invention.

In one embodiment, this invention is a tensioning assembly that is installed on the wheels of track-laying vehicle 1. Referring to FIG. 2, tensioning assembly 20 includes a rigid beam assembly 21. Rigid beam assembly 21 comprises rigid hollow member 22 and beam element 23 that telescopically extends into rigid hollow member 22. In this regard, it is preferable that rigid beam element 23 has a significant portion of its total length extending into rigid hollow member 22 and that both pieces have mating noncircular cross-sections. The extra length generally increases the overall strength of assembly 22 and the mating noncircular cross-sections generally prevent one piece from axially rotating in relation to the other piece.

The overall length of rigid beam assembly 21 is controlled by adjustment means 26, which holds rigid hollow member 22 and beam element 23 in selected positions of telescopic adjustment. Adjustment means 26 first comprises nut 27 that is welded or otherwise attached to a side of rigid hollow member 22. Adjust means 26 further comprises smooth-bored coupling 28 that is welded or otherwise attached to the same side of beam element 23 as the side of member 22 that nut 27 is attached. Still further, adjustment means 26 comprises rotary screw 29 that passes through coupling 28 and threads into nut 27, a nut 30 that is welded or otherwise attached to screw 29, and a nut 31 that is threaded over the end of screw 29.

Twisting screw 29 at nut 30 operates adjustment means 26. Twisting nut 30 in one direction increases the distance between nut 27 and nut 30 to lengthen rigid beam assembly 21, and twisting nut 30 in the opposite direction diminishes the distance between nut 27 and nut 30 allowing one to shorten rigid beam assembly 21. Once the length of rigid beam assembly is properly adjusted, nut 31 may then be tightened to lock adjustment means 26 in a desired position.

Figure 3:
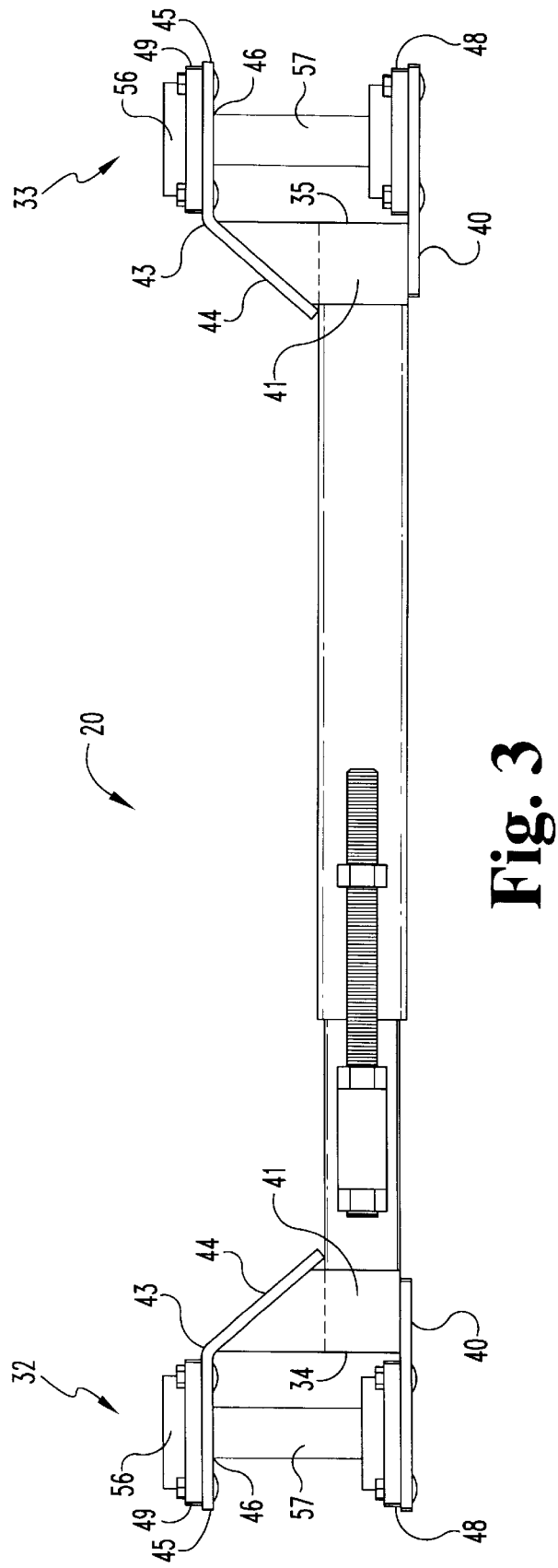
FIG. 3 is a plan view of a tensioning assembly according to one embodiment of this invention.

Referring to FIGS. 2 and 3, tensioning assembly 20 has a bearing assembly 32 and 33 respectively located at ends 34 and 35. Each bearing assembly includes a distal plate 40 extending beyond end 34 or 35, two gussets 41 and 42 that are located on opposite sides of end 34 or 35 in a position that is about flush with end 34 or 35 and perpendicular to distal plate 40, and proximal plate 43 that is mounted on top of and perpendicular with gussets 41 and 42. Distal plate 40 and gussets 41 and 42 are welded or otherwise attached to rigid beam assembly 21, and proximal plate 43 is welded or otherwise attached to gussets 41 and 42.

Conceptually, proximal plate 43 can be subdivided into two pieces, leg plate 44 and platform plate 45. Leg plate 44 is the portion of proximal plate 43 that is mounted over gussets 41 and 42. Platform plate 45 is the portion of proximal plate 43 that extends beyond gussets 41 and 42, parallel to distal plate 40, and contains a hole 46.

As shown in FIGS. 2 and 3, two flanged housing bearings 48 and 49 are bolted or otherwise respectively attached to distal plate 40 and platform plate 45. These bearings are coaxially mounted with hole 46 and are preferably of the premounted variety. As used here, "premcunted variety" refers to ball or roller bearings that are supplied with their own housings and seals. Bearings such as these are widely known and commercially available from such sources as Rockwell Automation/Dodge, 6040 Ponders Court, Greenville S.C. 29615.

Figure 4:
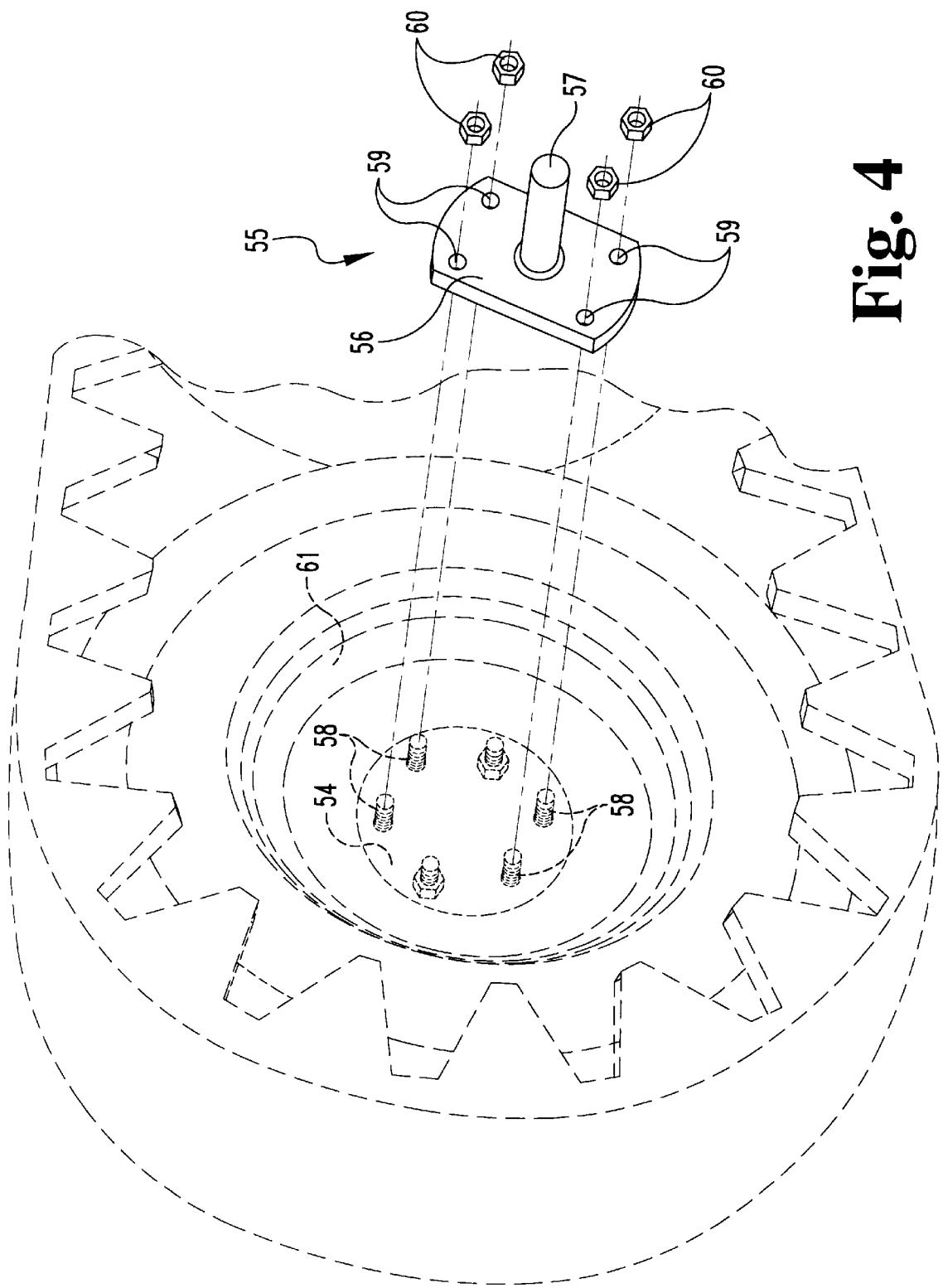
FIG. 4 is a perspective view of a portion of a tensioning assembly according to one embodiment of this invention

Referring next to FIG. 4, the first step to attach tensioning assembly 20 (not shown) to track-laying vehicle 1 is to mount axle extension 55 onto the external lateral face of hub 54 of wheels 9 and 10. Axle extension 55 comprises flange 56 and spindle 57 that is welded or otherwise perpendicularly attached to flange 56. Axle extension 55 is mounted to the external lateral face of hub 54 by positioning studs 58 through holes 59 in flange 56 and then threading nuts 60 onto studs 58 tightly against flange 56. Accordingly, it is preferable that flange 56 be of a size and shape to fit against hub 54 without interference from rim 61 of wheel 9 or 10. Otherwise, spindle 57 may not rotate in the same axis as the axle of wheel 9 or 10.

Figure 5:
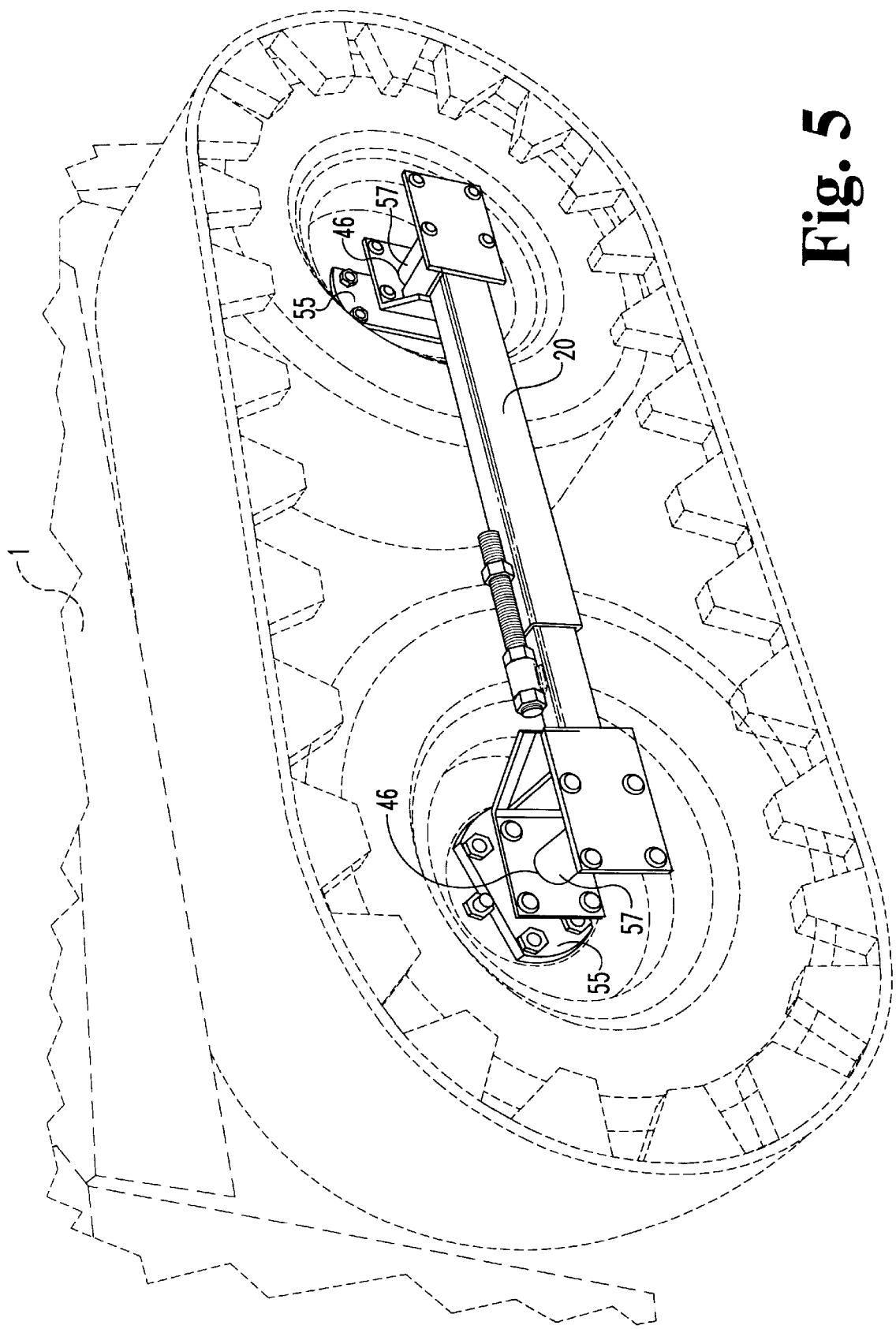
FIG. 5 is a perspective view of a tensioning assembly according to one embodiment of this invention that is mounted on a track-laying vehicle.

Referring to FIGS. 3 and 5, the second step to attach tensioning assembly 20 to track-laying vehicle 1 is to pass spindle 57 through hole 46 of each bearing assembly 32 and 33 and into each set of flanged housing bearings 48 and 49. Once positioned in each bearing assembly 32 and 33, the collars of each bearing 48 and 49 is locked onto spindle 57 in any acceptable manner and then the length of tensioning assembly 20 is slightly extended as previously described. The slight extension will relocate a portion of the stress caused by track 8 from the structure that supports wheels 9 and 10 to tensioning assembly 20 and help prevent the axles that support wheels 9 and 10 from deflecting toward each other.

THE CLAIMS

While an attempt has been made to illustrate and describe the invention in detail, please consider this as illustrative and not restrictive of the patent rights. The reader should understand that only the preferred embodiments have been presented and that all changes and modifications that come within the spirit of the invention are included if the following claims or the legal equivalent of these claims describes them.

In the Claims

What is claimed is:

1. A tensioning assembly for a track-laying vehicle having a track trained around the leading tread area of a first wheel and the lagging tread area of a second wheel, each wheel mounted on a hub, and at least one of said first and second wheels being a driven wheel, said tensioning assembly comprising, a rigid beam assembly having first and second ends, said rigid beam assembly including a rigid hollow member and a beam element slidably telescoped into said rigid hollow member;

first and second bearing means for carrying a rotating shaft, said bearing means respectively mounted to the first and second ends of said rigid beam assembly;

first and second shafts respectively journaled in said first and second bearing means; each of said shafts having a proximal end;

first and second means for respectively attaching the proximal ends of said first and second shafts to the external lateral face of said hubs of said first and second wheels and where said hub includes studs and said means for attaching includes a plate that is placed over said studs and against said hub.

2. The tensioning assembly of claim 1, wherein said wheels are pneumatic tires.

3. The tensioning assembly of claim 1, where said means for attaching is adapted to attach to the external lateral face of the hubs of said wheels without removing said wheels from said track-laying vehicle.

4. The tensioning assembly of claim 1, where said rigid hollow member and said beam element have mating non-circular cross-sections.

5. The tensioning assembly of claim 1, where said track is made of elastomeric material.

6. The tensioning assembly of claim 1, where said track is made of metal.

7. The tensioning assembly of claim 1, further comprising adjustment means for varying the distance between said first and second ends.

8. A tensioning assembly for a track-laying vehicle having a track trained around the leading tread area of a first wheel and the lagging tread area of a second wheel, each wheel mounted on a hub, and at least one of said first and second wheels being a driven wheel, said tensioning assembly comprising, a rigid beam assembly having first and second ends, said rigid beam assembly including a rigid hollow member and a beam element slidably telescoped into said rigid hollow member;

first and second bearing means for carrying a rotating shaft, said bearing means respectively mounted to the first and second ends of said rigid beam assembly, where each of said first and second bearing means includes at least one flanged housing bearing;

first and second shafts respectively journaled in said first and second bearing means; each of said shafts having a proximal end;

first and second means for respectively attaching the proximal ends of said first and second shafts to the external lateral face of said hubs of said first and second wheels;

said beam element being slidably adjustable in said hollow member to control the tension of said track.

9. The tensioning assembly of claim 8, where each of said first and second bearing means includes at least two flanged housing bearings.

* * * * *